(12) United States Patent
Maitay et al.

(10) Patent No.: US 6,302,151 B1
(45) Date of Patent: Oct. 16, 2001

(54) FLEXIBLE HOSE OF MULTILAYER PLASTICS MATERIAL

(75) Inventors: Frédéric Maitay, Vitry le Francois; Fabrice Leray, Maison en Champagne, both of (FR)

(73) Assignee: Tricoflex SA, Rueil Malmaison (FR)

( * ) Notice: Subject to any disclaimer, the term of this patent is extended or adjusted under 35 U.S.C. 154(b) by 0 days.

(21) Appl. No.: 09/578,680

(22) Filed: May 26, 2000

(30) Foreign Application Priority Data

May 26, 1999 (FR) .................................................. 99 06636

(51) Int. Cl.[7] .................................................. F16L 11/08
(52) U.S. Cl. ........................ 138/125; 138/137; 138/141; 138/153; 138/DIG. 1
(58) Field of Search ...................................... 138/124, 125, 138/141, 137, 153, DIG. 1

(56) References Cited

U.S. PATENT DOCUMENTS

| | | | |
|---|---|---|---|
| 3,574,810 | 4/1971 | Tournery et al. . | |
| 3,828,112 | * 8/1974 | Johansen et al. | 138/126 |
| 3,977,440 | * 8/1976 | Phillippi | 138/130 |
| 4,007,070 | * 2/1977 | Busdiecker | 138/141 |
| 4,652,475 | * 3/1987 | Haney et al. | 138/137 |
| 4,998,564 | * 3/1991 | Igarashi et al. | 138/127 |
| 5,232,645 | * 8/1993 | Ramos, Jr. | 138/125 |
| 5,373,870 | * 12/1994 | Derroire et al. | 138/126 |
| 5,538,513 | * 7/1996 | Okajima | 138/124 |
| 5,588,469 | * 12/1996 | Kakiuchi et al. | 138/126 |
| 5,647,400 | 7/1997 | Jani et al. . | |
| 5,918,642 | * 7/1999 | Akedo et al. | 138/129 |
| 6,062,269 | * 5/2000 | Tanaka et al. | 138/126 |

FOREIGN PATENT DOCUMENTS

| | | |
|---|---|---|
| 4338424 | 5/1994 | (DE) . |
| 1171933 | 11/1969 | (GB) . |

* cited by examiner

Primary Examiner—James Hook

(57) ABSTRACT

A flexible hose of multilayer plastics material for transporting fluids, the hose comprising from the inside towards the outside:

an inner layer of a polyolefin that is inert relative to water;

a bonding layer having adhesive properties relative to the polyolefin and to the flexible polyvinyl chloride;

a layer of flexible polyvinyl chloride; and tubular reinforcement in contact with the polyvinyl chloride.

7 Claims, 1 Drawing Sheet

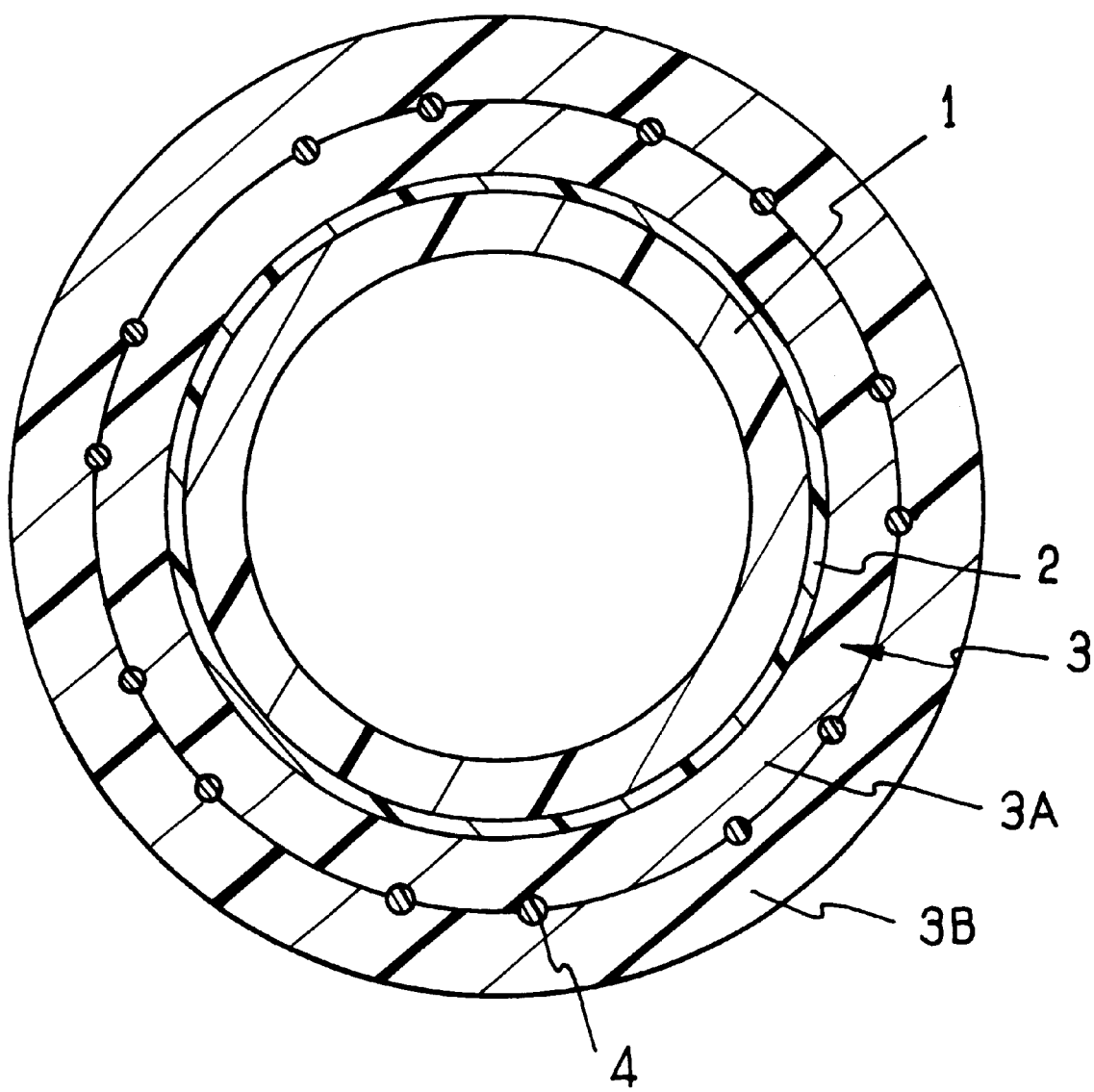

FLEXIBLE HOSE OF MULTILAYER PLASTICS MATERIAL

The present invention relates to a flexible hose of multilayer plastics material for carrying fluids, e.g. for the purpose of being fitted in fixed or moving installations for distributing potable water.

BACKGROUND OF THE INVENTION

At present, elements for fitting in circuits for distributing potable water, e.g. pipes, faucets, or couplings, need to receive health standards approval at two levels. At a first level, the elements can be used only in applications where it comes into contact with the transported potable water for short durations only, possibly in repeated manner. In the second level, the element is suitable for use in any application concerned with transporting potable water, and in particular applications where water is continuously in contact with the element.

All pipes complying with second level are rigid in structure. Thus, such pipes are known that are made of special rigid polyethylene, polypropylene, or polyvinyl chloride that are inert both chemically and physically relative to the potable water being transported. Such pipes are easy to manufacture and of low cost, so they are in widespread use in distribution installations. Nevertheless, the rigidity of such plastic material pipes puts limits on installation thereof and maintenance thereof.

There thus exists a need that is not conveniently satisfied at present for a pipe that is easy to fit in permanent or temporary manner in an installation for distributing potable water.

OBJECTS AND SUMMARY OF THE INVENTION

To this end, the invention provides a flexible hose of multilayer plastics material, comprising from the inside towards the outside:

an inner layer of a polyolefin that is inert relative to water;
a bonding layer having adhesive properties relative to the polyolefin and to the flexible polyvinyl chloride;
a layer of flexible polyvinyl chloride; and
tubular reinforcement in contact with the polyvinyl chloride.

A hose made in this way presents a structure that makes it suitable for transporting potable water, has flexibility that makes the hose easy to fit, and possessing relatively good mechanical qualities, in particular concerning bursting strength, given the pressure that is usually to be found in the circuits for which the hose is intended, and strength against external forces.

Furthermore, it has been found that this hose presents good resistance to solvents, in particular at temperatures of less than about 40° C.

Furthermore, this hose also presents the property of withstanding strong acids and bases at temperatures of less than 40° C.

In a particular embodiment, the thicknesses of the layers lie in the following ranges:

0.1 mm to 1 mm approximately for the inner layer;
0.1 mm to 0.3 mm approximately for the bonding layer; and
0.5 mm to 4 mm approximately for the layer of polyvinyl chloride.

This structure represents a good compromise between flexibility and mechanical strength.

BRIEF DESCRIPTION OF THE DRAWINGS

Other characteristics and advantages of the invention will appear on reading the following description of a particular non-limiting embodiment of the invention.

Reference is made to the sole accompanying FIGURE which is a cross-section view of a hose in accordance with the invention.

MORE DETAILED DESCRIPTION

With reference to the FIGURE, the hose of the invention has an inner layer 1 made of a polyethylene whose characteristics are compatible with transporting water and comply with health standards that require such a layer to be suitable for being continuously in contact with stagnant water. Specifically, the material used is inert, both physically and chemically, relative to the transported water so as to avoid giving rise to any unacceptable modification of the composition of foods or to any spoiling of the organoleptic properties thereof. The thickness of the inner layer 1 lies in the range 0.1 mm to 1 mm. The thinness of the inner layer makes it deformable and contributes to imparting flexibility to the hose. By way of example, for a hose having an inside diameter of 12 mm, the inner layer has thickness of about 0.5 mm and the polyethylene used is the polyethylene produced by Hoechst under the reference Hostalem MPE80. The inner layer 1 can also be made out of any other polyolefin approved for potable water, and in particular out of polypropylene.

The inner layer 1 is covered in an intermediate layer 2 that bonds the inner layer 1 to an outer layer 3 that is made of polyvinyl chloride and that covers the intermediate layer 2.

The intermediate layer 2 is made of a material that has adhesive properties both with polyethylene and with polyvinyl chloride. Specifically, the intermediate layer 2 is made from an ethylene vinyl acetate (EVA) copolymer which adheres to the layers 1 and 3. The copolymer used is of food grade. By way of example, the material used comes from Dupont de Nemours and is referenced Elvax 170. The thickness of the intermediate layer 2 lies in the range 0.1 mm to 0.3 mm, and in this case is about 0.2 mm.

The outer layer 3 is constituted by a first layer 3A of flexible polyvinyl chloride of thickness lying in the range 0.5 mm to 2 mm, and a second layer 3B of flexible polyvinyl chloride layer, likewise of thickness lying in the range 0.5 mm to 2 mm. The polyvinyl chloride used is of food grade. The outer layer 3 could also be made as a single piece.

Tubular reinforcement 4 is placed in contact with the polyvinyl chloride between the two layers 3A and 3B of the outer layer 3. Naturally, the tubular reinforcement 4 could also be located between the intermediate layer 2 and the outer layer 3. In this case the tubular reinforcement 4 is based on fibers of polyethylene terephthalate (PET). It would also be possible to use fibers of polyamide or of polypropylene.

The hose made in this way complies with the [French] Regulation of May 29, 1997 relating to objects used in the distribution potable water for human consumption.

Furthermore, it will be observed that this hose possesses physico-chemical properties that enable it to withstand solvents and strong acids and bases at temperatures below about 40° C.

The hose of the invention is made using the well-known technique of coextrusion.

In general, the thicknesses of the various layers are determined in such a manner as to ensure that the hose is sufficiently flexible and strong, and they are adapted to the inside diameter of the hose.

Naturally, the invention is not limited to the embodiment described, and variants could be made thereto without going beyond the ambit of the invention as defined by the claims.

What is claimed is:

1. A flexible hose of multiplayer plastics material, the hose comprising, from the inside to the outside:
    an inner layer of a polyolefin that is inert relative to water having a thickness comprised between 0.1 and 1 mm,
    a layer of flexible polyvinyl chloride having a thickness comprised between 0.5 and 4 mm,
    a bonding layer having adhesive properties relative to the polyolefm and to the flexible polyvinyl chloride and having a thickness from 0.1 to 0.3 mm, and a tubular reinforcement in contact with the polyvinyl chloride.

2. A hose according to claim 1, wherein the inner layer is of polyethylene.

3. A hose according to claim 1, wherein the inner layer is of polypropylene.

4. A hose according to claim 1, wherein the bonding layer is made from a copolymer of ethylene and vinyl acetate.

5. A hose according to claim 1, wherein the reinforcement is situated between first and second layers of polyvinyl chloride together making up said layer of polyvinyl chloride.

6. A hose according to claim 1, wherein the reinforcement is based on fibers of polyethylene terephthalate.

7. A hose according to claim 1, wherein the reinforcement is based on polyamide fibers.

* * * * *

UNITED STATES PATENT AND TRADEMARK OFFICE
CERTIFICATE OF CORRECTION

PATENT NO. : 6,302,151 B1
DATED : October 16, 2001
INVENTOR(S) : Frederic Maitay et al.

It is certified that error appears in the above-identified patent and that said Letters Patent is hereby corrected as shown below:

<u>Title page,</u>
Item [73] Assignee, please correct the assignee's name from "Tricoflex SA" to
-- Hozelock Tricoflex SA --

Signed and Sealed this

Fourteenth Day of May, 2002

*Attest:*

JAMES E. ROGAN
*Attesting Officer*   *Director of the United States Patent and Trademark Office*